United States Patent
Boutaleb et al.

(10) Patent No.: US 10,883,382 B2
(45) Date of Patent: Jan. 5, 2021

(54) OUTLET GUIDE VANE FOR AIRCRAFT TURBOMACHINE, COMPRISING A LUBRICANT COOLING PASSAGE EQUIPPED WITH FLOW DISTURBANCE STUDS

(71) Applicant: SAFRAN AIRCRAFT ENGINES, Paris (FR)

(72) Inventors: Mohammed-Lamine Boutaleb, Moissy-Cramayel (FR); Amélie Argie Antoinette Chassagne, Moissy-Cramayel (FR); Dimitri Daniel Gariel Marquie, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 91 days.

(21) Appl. No.: 16/222,020

(22) Filed: Dec. 17, 2018

(65) Prior Publication Data

US 2019/0186293 A1    Jun. 20, 2019

(30) Foreign Application Priority Data

Dec. 19, 2017    (FR) ..................................... 17 62405

(51) Int. Cl.
*F01D 25/18*    (2006.01)
*F01D 25/12*    (2006.01)
(Continued)

(52) U.S. Cl.
CPC ............. *F01D 25/12* (2013.01); *F01D 9/041* (2013.01); *F01D 9/065* (2013.01); *F01D 25/125* (2013.01);
(Continued)

(58) Field of Classification Search
None
See application file for complete search history.

(56) References Cited

U.S. PATENT DOCUMENTS 4,914,904 A    4/1990 Parnes et al.
8,616,834 B2    12/2013 Knight, III et al.
(Continued)

FOREIGN PATENT DOCUMENTS

| EP | 1630358 A2 | 3/2006 |
|---|---|---|
| FR | 2989110 A1 | 10/2013 |
| FR | 3046811 A1 | 7/2017 |

OTHER PUBLICATIONS

Search Report issued in French Patent Application No. 17 62405 dated May 18, 2018.

*Primary Examiner* — Michael Lebentritt
(74) *Attorney, Agent, or Firm* — Pearne & Gordon LLP (57) ABSTRACT

A guide vane for an aircraft turbomachine, the aerodynamic part of the vane being defined by an extrados body and an intrados body, the part comprising an internal lubricant cooling passage equipped with flow disturbing studs, including a first series of studs made in a single piece with the extrados body, and a second series of studs made in a single piece with the intrados body, the studs of the second series defining a second inter-stud space between them through which studs of the first series pass while the studs of the second series pass through the first inter-stud space. Furthermore, the end of the studs is located at a distance from the intrados body, and the end of the studs is located at a distance from the extrados body.

10 Claims, 5 Drawing Sheets

(51) Int. Cl.
*F01D 9/04* (2006.01)
*F02C 7/14* (2006.01)
*F01D 9/06* (2006.01)
*F02K 3/062* (2006.01)

(52) U.S. Cl.
CPC ............... *F01D 25/18* (2013.01); *F02C 7/14* (2013.01); *F02K 3/062* (2013.01); *F05D 2220/323* (2013.01); *F05D 2240/12* (2013.01); *F05D 2250/185* (2013.01); *F05D 2260/20* (2013.01); *F05D 2260/22141* (2013.01); *F05D 2260/98* (2013.01)

(56) References Cited

U.S. PATENT DOCUMENTS

| | | | |
|---|---|---|---|
| 2013/0276461 A1* | 10/2013 | Propheter-Hinckley | F01D 5/16 60/806 |
| 2014/0328669 A1* | 11/2014 | Bregman | F01D 5/187 415/115 |
| 2018/0023406 A1* | 1/2018 | Zaccardi | F01D 5/185 415/115 |
| 2018/0258779 A1* | 9/2018 | Boutaleb | F02C 7/14 |
| 2018/0306042 A1* | 10/2018 | Zaccardi | F01D 5/185 |
| 2019/0078452 A1* | 3/2019 | Zaccardi | F02C 7/14 |

\* cited by examiner

OUTLET GUIDE VANE FOR AIRCRAFT TURBOMACHINE, COMPRISING A LUBRICANT COOLING PASSAGE EQUIPPED WITH FLOW DISTURBANCE STUDS

TECHNICAL DOMAIN

This invention relates to the field of twin-spool turbomachines for aircraft, and particularly the design of guide vanes arranged in all or part of a turbomachine fan air flow.

These are preferably "Outlet Guide Vanes" (OGV), designed to straighten the air flow at the fan outlet. Alternatively or simultaneously, guide vanes could be placed at the fan intake. The guide vanes are conventionally located in the turbomachine fan flow.

The invention preferably relates to an aircraft turbojet fitted with such outlet guide vanes. The invention also relates to a method of making such a vane.

STATE OF PRIOR ART

On some twin-spool turbomachines, it is known that outlet guide vanes can be installed downstream from the fan to straighten the outlet flow from the fan, and possibly also to perform a structural function. This structural function is intended to transfer forces from the centre of the turbomachine to an outer shell located along the prolongation of the fan case. In this case, an engine attachment is conventionally formed on or close to this outer shell, to form the attachment between the turbomachine and an aircraft attachment pylon.

It was also recently disclosed that an additional function can be assigned to the outlet guide vanes. This is a heat exchanger function between the outside air passing through the ring of outlet guide vanes, and lubricant circulating inside these vanes. This heat exchange function is for example known as disclosed in document U.S. Pat. No. 8,616,834, or document FR 3 046 811.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity associated with exchangers designed for cooling the lubricant should be adapted accordingly. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the fan flow path, reducing or eliminating them can limit disturbances in the fan flow and thus increase the global efficiency of the turbomachine.

Studs can be installed in the lubricant internal cooling passage to disturb the lubricant flow and increase the wetted area, to obtain a better heat exchange. Thus, fabrication becomes longer and/or more expensive as the required thermal performance increases, especially when the vane is long.

Consequently, there is still a need to create a design providing a high performance thermal function, while facilitating fabrication of this vane with integrated exchanger.

SUMMARY OF THE INVENTION

In order to at least partially satisfy this need, the first purpose of this invention is a guide vane that will be arranged in all or part of an air flow stream from a fan of a twin spool aircraft turbomachine, the guide vane comprising a root, a tip and an aerodynamic part straightening the flow stream arranged between the vane root and tip, the vane comprising an extrados body defining at least part of an extrados surface of the aerodynamic part, and an intrados body defining at least part of an intrados surface of the aerodynamic part, the latter comprising at least one internal lubricant cooling passage equipped with flow disturbing studs and delimited at least partly by the intrados and extrados bodies fixed to each other.

According to the invention, a first series of studs is made in a single piece with the extrados body, the studs of the first series defining a first inter-stud space between them, a second series of studs is made in a single piece with the intrados body, the studs of the second series defining a second inter-stud space between them through which studs of the first series pass while the studs of the second series pass through the first inter-stud space, and finally the end of the studs of the first series being located at a distance from the intrados body and the end of the studs of the second series being located at a distance from the extrados body.

Thus, the invention ingeniously discloses an interpenetration of two series of studs laid out on the extrados and intrados bodies respectively, which means that heat exchanges can be increased without requiring the use of complex fabrication. Due to the interpenetration of studs specific to the invention, disturbances generated by these studs also make the lubricant move along the direction of the thickness of the vane, which increases the wetted area and the convection phenomenon. Furthermore, the studs can be made conventionally on each of the two bodies of the vane, for example by simple machining or by casting.

In other words, the disclosed invention is different from previous embodiments in that it discloses studs made on the two bodies that form the vane, and that interpenetrate so as to further increase flow disturbances in the lubricant circulating in the inner passage.

The invention preferably includes at least any one of the following optional characteristics, taken in isolation or in combination.

Each of the first and second series of studs is in the form of a matrix defining the rows and columns of studs. This particular arrangement facilitates fabrication of the studs, particularly when they are made by machining.

The studs in the first and second series of studs are then preferably arranged to be staggered. Alternatively, they may for example be arranged so as to define an alternation of columns made exclusively with studs in the first series, and columns made exclusively with studs in the second series.

According to another embodiment, the studs in each of the first and second series of studs are staggered. It is then preferably arranged such that the studs in the first and second series of studs are arranged so as to jointly define a matrix forming rows and columns of studs, each of the rows and columns in the matrix then being made by the alternation of studs in the first series and studs in the second series.

Regardless of which embodiment is envisaged, each stud preferably has a generally circular, oblong, square or rectangular cross-section.

Another purpose of the invention is an aircraft turbomachine, preferably a turbojet, comprising a plurality of guide vanes like that described above, arranged downstream or upstream from a fan of the turbomachine.

Finally, another purpose of the invention is a method of fabricating such a guide vane, including a step to make the studs by machining extrados and intrados bodies.

Other advantages and characteristics of the invention will appear in the non-limitative detailed description given below.

BRIEF DESCRIPTION OF THE DRAWINGS

This description will be made with reference to the appended drawings among which;

FIG. 2b is an enlarged partial view of the view in the FIG. 2a;

DETAILED DESCRIPTION OF PREFERRED EMBODIMENTS

Figure 1:
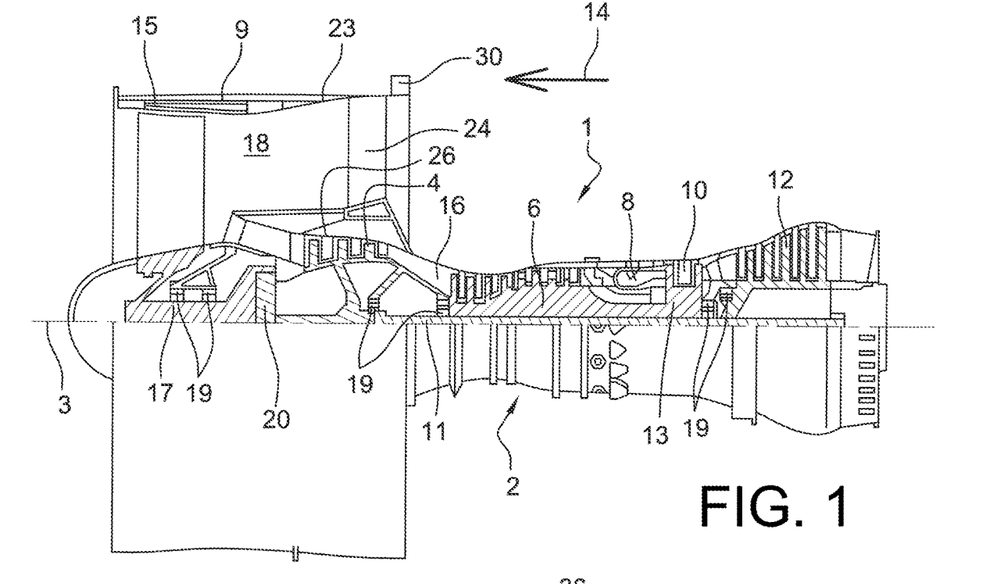
FIG. 1 diagrammatically represents a side view of a turbojet according to the invention.

With reference to FIG. 1, the figure represents a twin-spool twin-flow turbojet, with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward" and "aft" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, that in this case is located directed aft from an engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core path 16 through which a core flow will pass, and a bypass path 18 through which a fan flow will pass and that is radially outside the core flow, therefore the fan flow being separated. As is well known to an expert in the subject, the fan flow path 18 is delimited radially externally partly by an outer shell 23, preferably metallic, prolonging the fan case 9 in the aft direction.

Although not shown, the turbojet 1 is equipped with a set of equipment, for example such as a fuel pump, a hydraulic pump, alternator, starter, variable stator vane (VSV) actuator, discharge valve actuator, or electrical power generator. In particular, there is equipment for lubrication of the reduction gear 20. This equipment is driven by an accessories gear box (AGB) (not shown) that is also lubricated.

There is a ring of guide vanes that in this case are outlet guide vanes 24 (OGV) in the bypass path 18, downstream from the fan 15. These stator vanes 24 connect the outer shell 23 to a casing 26 surrounding the low pressure compressor 4. They are circumferentially spaced from each other to straighten the fan flow after it has passed through the fan 15. Furthermore, these vanes 24 can also perform a structural function, as is the case in the example embodiments described herein. They transfer forces from the reduction gear and roller bearings 19 of the engine shafts and the fan hub, to the outer shell 23. These forces can then transit through an engine attachment 30 fixed onto the shell 23 connecting the turbojet to an attachment pylon (not shown) of the aircraft.

Finally, in the example embodiments described herein, the outlet guide vanes 24 perform a third heat exchanger function between the fan air flow passing through the ring of vanes, and the lubricant circulating inside these vanes 24. The lubricant that will be cooled by the outlet guide vanes 24 is the lubricant that lubricates the roller bearings 19, and/or the turbojet equipment, and/or the accessories gearbox, and/or the reduction gear 20. These vanes 24 thus form part of the fluid circuit(s) in which lubricant is circulated to lubricate the associated element(s) successively, and then to be cooled.

With reference to FIGS. 2 to 5, we will describe one of the outlet guide vanes 24, according to a first preferred embodiment of the invention. It should be noted that the invention as described can be applied to all vanes 24 of the stator ring centred on the axis 3, or only to some of these vanes.

Figure 2:
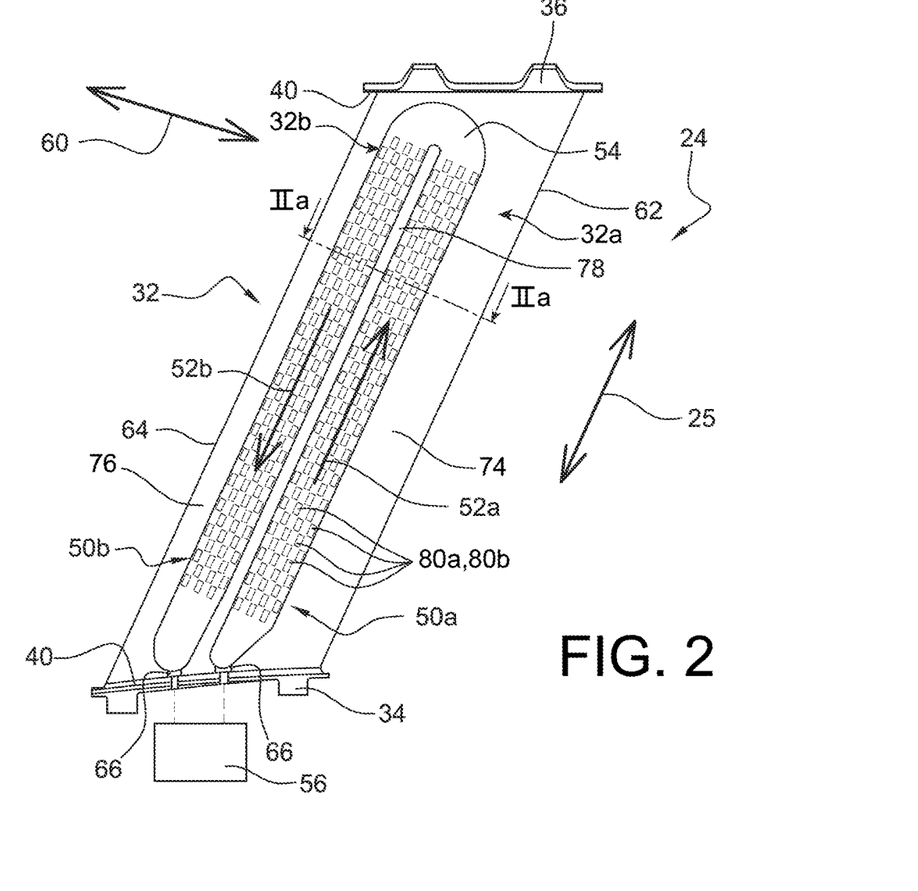
FIG. 2 represents a more detailed enlarged view of an outlet guide vane of the turbojet shown on the preceding figure, according to a first preferred embodiment of the invention.

The vane 24 may be oriented precisely along the radial direction as shown on FIG. 1, or it can be slightly inclined in the axial direction as shown on FIG. 2. In all cases, it is preferably straight when viewed from the side as shown on FIG. 2, and extends along a direction of the length 25.

The outlet guide vane 24 comprises an aerodynamic part 32 that corresponds to its central part, in other words the part exposed to the fan flow. The vane 24 comprises a root 34 on one side of this aerodynamic part 32 straightening the outlet flow from the fan, and a tip 36 on the other side.

The root 34 is used to fix the vane 24 to the low pressure compressor case, while the tip is used to fix this vane onto the outer shell prolonging the fan case. Furthermore, the vane 24 comprises platforms 40 at its root and its tip to reconstitute the bypass path between the vanes 24 along the circumferential direction. Alternatively, the platforms 40 can be added on between the vanes 24.

The aerodynamic part 32 of the vane is preferably fabricated in two distinct parts, then put together and firmly fixed to each other. The first step is an extrados body 32a, that includes not only a large part of the aerodynamic part 32, but also the root 34, the tip 36 and the platforms 40. This body 32a is made in a single piece, for example by casting and then machining. The other part is formed by a extrados body 32b, in the form of a cap closing the body 32a fixed to it by a conventional technique such as welding, brazing or gluing. The intrados body 32b may also be made in a single piece by means of conventional techniques, for example also by casting and then machining.

Figure 2A:
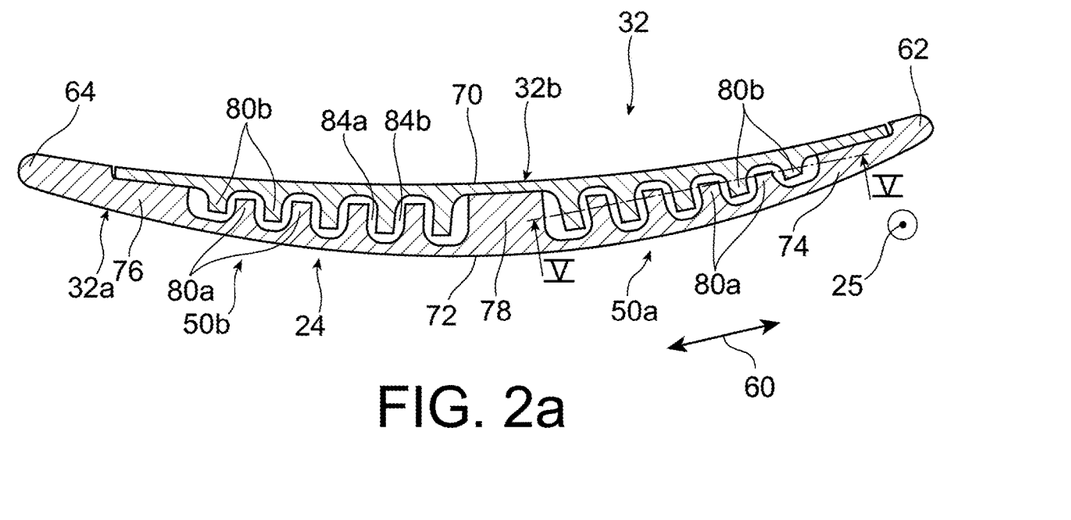
FIG. 2a is a sectional view along line IIa-IIa in FIG. 2.

In this first preferred embodiment of the invention, the aerodynamic part 32 is equipped with two internal passages 50a, 50b approximately parallel to each other and parallel to the length direction 25. More precisely, a first internal lubricant cooling passage 50a extends along a first main flow direction 52a of the lubricant. This direction 52a is approximately parallel to the length direction 25, along the direction from the root 34 towards the tip 36. Similarly, there is a second internal lubricant cooling passage 50b that extends along a second main flow direction 52b of the lubricant, within this passage. This direction 52b is also approximately parallel to the length direction 25, along the opposite direction from the tip 36 towards the root 34. Therefore the first passage 50a is designed so that lubricant can pass through it radially outwards, while the second passage 50b is designed so that lubricant passes through it radially inwards. The radially outer ends of the two passages 50a, 50b are provided with a fluid connection passing through a 180° bend 54, corresponding to a hollow formed in the aerodynamic part 32, close to the tip 36, to connect one passage to the other. Alternatively, the passages 50a, 50b are not connected to each other within the aerodynamic part 32 of the vane 24, but each extends separately over the entire length of the aerodynamic part 32. A fluid connection can be made between the two passages outside the vane 24, for example using a connection bend formed radially outwards from the vane tip 36, for example bearing on this tip.

The internal radial ends of the two passages 50a, 50b are connected to the lubricant circuit 56, diagrammatically represented by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the inner radial end of the second passage 50b. Connectors 66 make the fluid communication between the internal radial ends of the passages 50a, 50b and the circuit 56, these connectors 66 passing through the root 34.

The two passages 50a, 50b and the bend 54 together generally form a U shape, with the first passage 50a and the second passage 50b offset from each other along a transverse direction 60 of the vane approximately orthogonal to the length direction 25. Heat exchanges are optimised by having the first passage 50a adjacent to a trailing edge 62 of the vane 24, while the second passage 50b is adjacent to a leading edge 64. However, an inverse situation can be adopted without going outside the scope of the invention. Note also that the invention may include an aerodynamic part 32 with only one internal cooling passage, without going outside the framework of the invention. In this case, lubricant would pass through some of the vanes from inside to outside, while lubricant would pass through other vanes in the opposite direction.

At the aerodynamic part 32, the extrados body 32a comprises an extrados surface 72, a solid zone 74 located close to the leading edge 62, a solid zone 76 located close to the leading edge 64, and a solid central zone 78. These three zones 74, 76, 78 are in contact with the intrados body 32b, and the two zones 74, 76 have indentations for the support and attachment of this intrados body 32b. The central zone 78 also provides a structural reinforcement and extends from the root 34 to the bend 54, while the solid zones 74, 76 extend approximately along the entire length of the aerodynamic part 32, along the length direction 25.

The first passage 50a is formed between the solid zones 74, 78, while the second passage 50b is formed between the solid zones 76, 78. The passages 50a, 50b extend in the transverse direction 60 with a variable thickness between the two bodies 32a, 32b. The maximum thickness of these passages may be of the order of a few millimetres. Alternatively, the passages 50a, 50b could have a constant thickness, without going outside the framework of the invention.

The intrados body 32b defines the intrados surface 70, or a large part of it.

The two internal lubricant cooling passages 50a, 50b are specific in that they include flow disturbing studs. These studs are formed on the extrados body 32a and on the intrados body 32b, and interpenetrate inside the passages 50a, 50b, as will be described below.

The arrangement and the shape of the studs are almost identical to or are similar in the two passages 50a, 50b. They are also installed with the same densities, although the densities could be different without going outside the scope of the invention. Consequently, only the studs in the first internal passage 50a will be described below, but it should be understood that this description is equally applicable by analogy to the studs in the second internal passage 50b. It is also noted that the bend 54 defines an internal space that is preferably free of studs.

Figure 3:
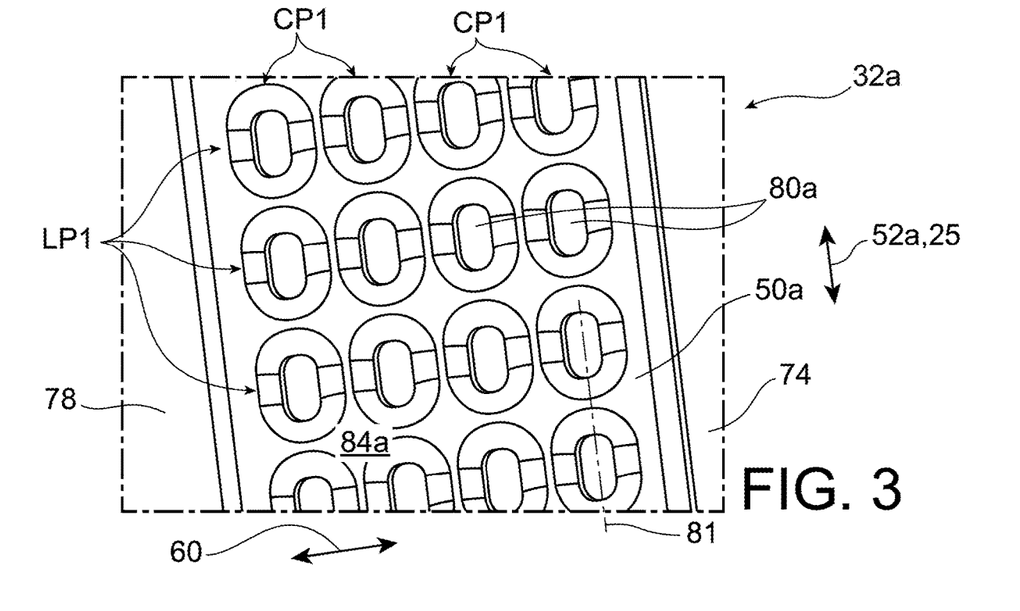
FIG. 3 is an enlarged perspective view of part of an extrados body of the outlet guide vane shown on FIGS. 2 to 2b.

In the first passage 50a, firstly a first series of studs 80a is provided made in a single piece with the extrados body 32a. These studs 80a are preferably formed by machining the surface of the body 32a opposite the extrados surface 72. The studs 80a are thus made projecting towards the intrados body 32b, while being approximately orthogonal to the direction 52a. The height of the stud in the direction of the body 32b is for example of the order or one or several millimetres. In at least one passage zone 50a, and preferably in the entire passage zone, the contact elements 80a are chosen with a density equal for example to about 3 studs/$cm^2$. More generally, the average density is between for example about 1 and 5 studs/$cm^2$.

Figure 5:
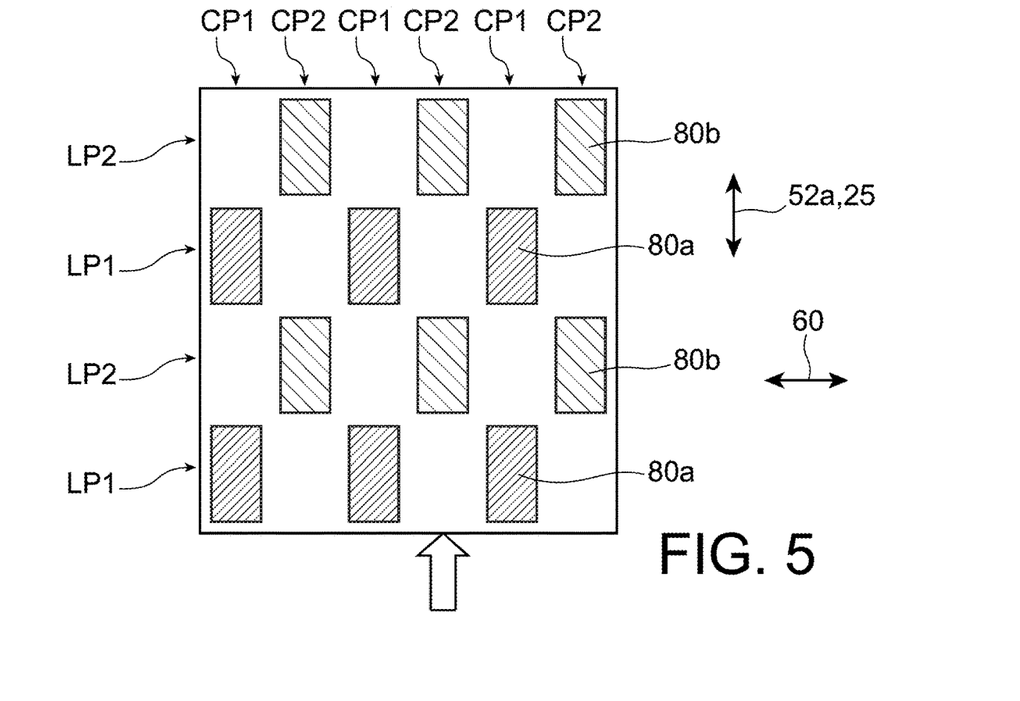
FIG. 5 represents a partial sectional view along line V-V in FIG. 2a, passing orthogonally through the flow disturbance studs.

The studs 80a can have a generally rectangular shaped section as shown on FIG. 5, or they may be oblong in shape as shown on FIG. 3. This oblong shape is preferred, particularly when its large axis 81 is arranged parallel to the direction 52a. Nevertheless other shapes can be adapted for the section that is preferably almost identical over the entire height of the stud, for example such as a generally square shaped stud.

In this first preferred embodiment, the first series of studs 80a is in the form of a matrix defining first columns of studs CP1, and first rows of studs LP1. The columns of studs CP1 succeed each other along the direction 60, while the rows of studs LP1 succeed each other along the direction 52a. The rows and columns are preferably almost straight with regular spacing inherent to the shape of the matrix, which enables simple machining of the studs 80a, making passes parallel and perpendicular to each other.

Thus, there are several tens of rows of studs 80a in the passage 50a, that succeed each other along the first direction 52a. Furthermore, the number of columns CP1 can be equal to between 2 and 8, for example 4.

Finally, note that a first interstud space 84a is defined between the studs 80a of the first series.

Figure 4:
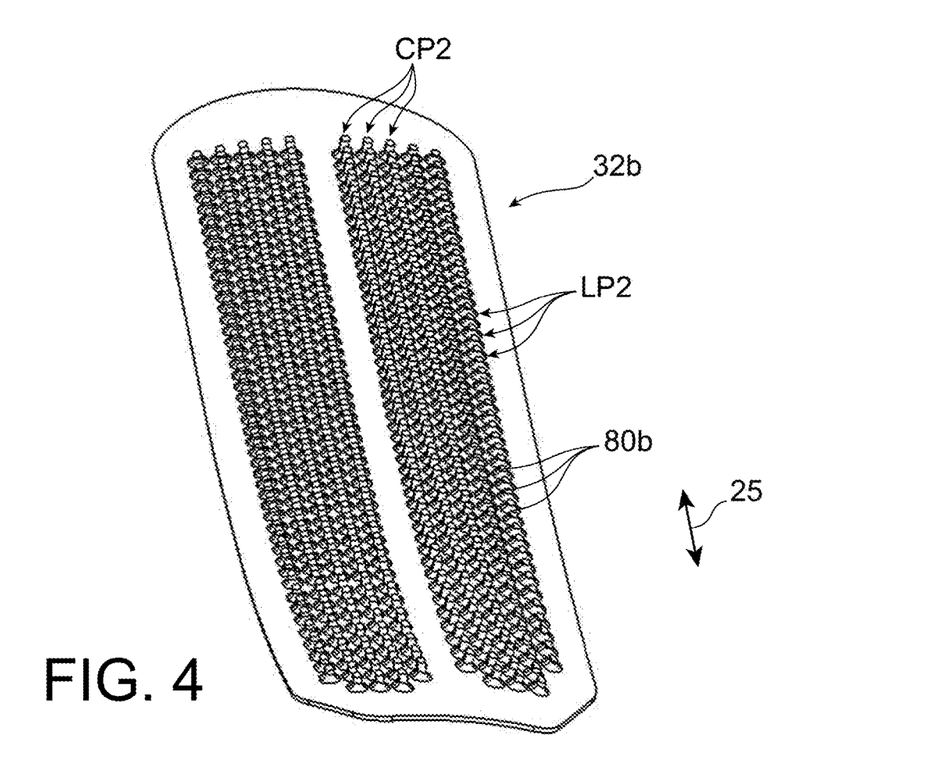
FIG. 4 is an enlarged perspective view of an intrados body of the outlet guide vane shown on FIGS. 2 to 2b.

A similar embodiment is made for the intrados body 32b. In the first passage 50a, a second series of studs 80b is also provided made in a single piece with the intrados body 32b. These studs 80b are preferably formed by machining the surface of the body 32b opposite the intrados surface 70. The studs 80b are thus made projecting towards the extrados body 32a, while being approximately orthogonal to the direction 52a. The height, shape and density of the stud are preferably identical to or similar to the values for the first series of studs 80a.

The second series of studs 80b is also in the form of a matrix defining second columns of studs CP2, and second rows of studs LP2. The columns of studs CP2 succeed each other along the direction 60, while the rows of studs LP2 succeed each other along the direction 52a. The number, shape and composition and spacings between rows and columns are preferably identical to values for the first series of studs 80a.

Finally, note that a second interstud space 84b referenced on FIG. 2a is defined between the studs 80b of the second series.

One of the special features of the invention lies in the fact that the studs 80a, 80b interpenetrate, in other words the studs 80a of the first series penetrate into the second interstud space 84b, in the same way as the studs 80b in the second series penetrate into the first interstud space 84a. Cooperation between the two bodies 32a, 32b is chosen such that the set of studs 80a, 80b, formed by the first and second series, are arranged to be staggered to increase disturbance to the lubricant flow and result in better heat exchange. This staggered arrangement is shown on FIG. 5. It is easily obtained by alternating first and second columns CP1, CP2, and by alternating first and second rows LP1, LP2. All that is necessary to achieve this is to shift the matrix of studs 80b (with the more widely spaced cross-hatching lines) from the matrix of studs 80a (with the more narrowly spaced cross-hatching lines), by a value of a half-pitch along the direction 52a, and a value of a half-pitch along the direction 60. In this respect, it is noted that the pitch between the columns of the matrix can be different from the pitch between the rows, or this pitch may be identical.

Figure 2B:
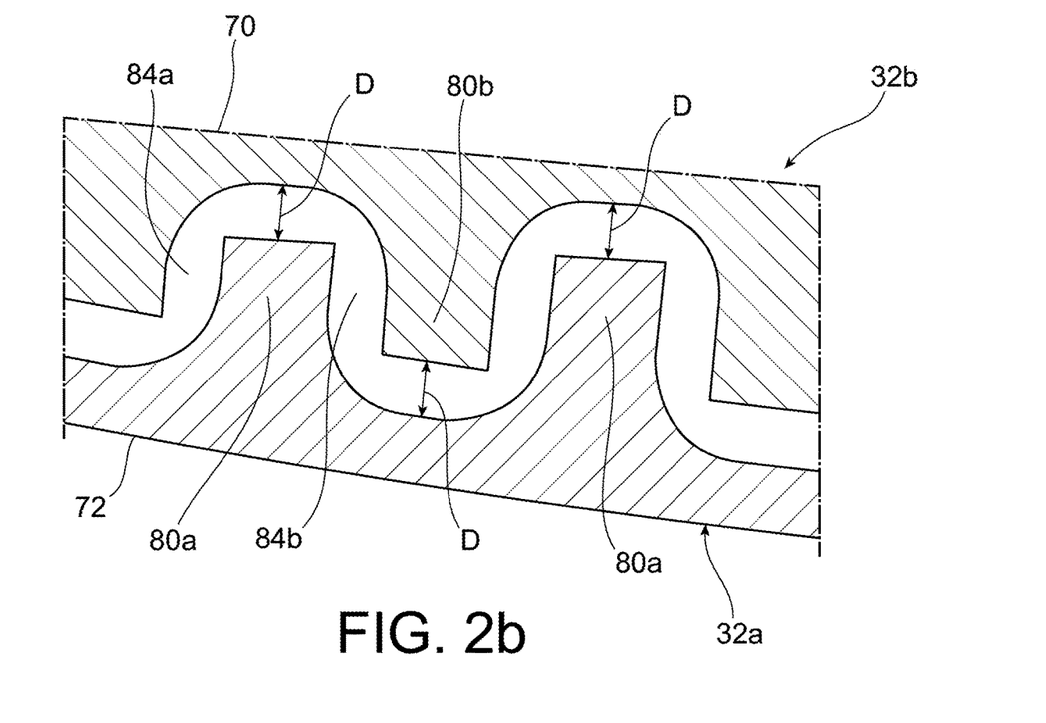

As shown on FIGS. 2a and 2b, the studs 80a, 80b do not come into contact with the opposite body 32a, 32b. In other words, the end of the studs 80a in the first series is located at a distance from the surface of the body 32b from which the studs 80b of the second series project, and the end of these studs 80b is located at a distance from the surface of the body 32a from which the studs 80a of the first series project. These separation distances "D" between the studs and their opposite body are referenced on FIG. 2b. These distances are preferably identical, for example from 0.5 to 3 mm. Consequently, the resulting interpenetration of studs further facilitates heat exchanges because the lubricant is forced to move also in the direction of the thickness of the vane when it circulates from the root to the tip, which increases the wetted surface area.

Figure 5A:
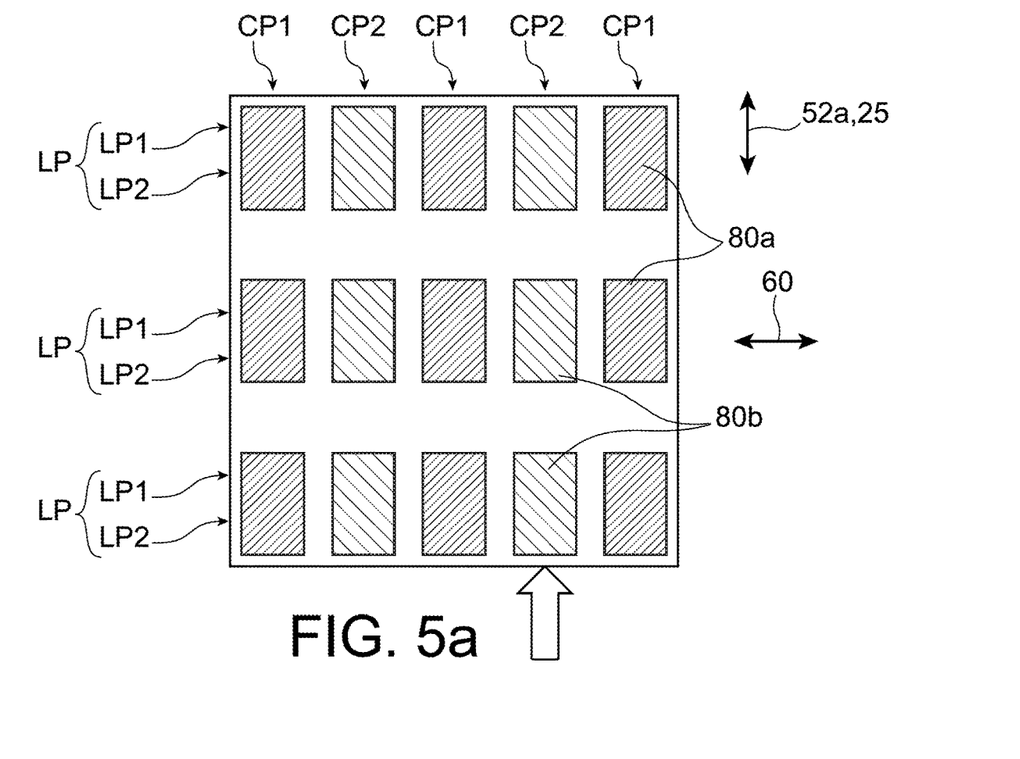
FIG. 5a is a view similar to that in FIG. 5, with studs arranged in an alternative embodiment.

According to one alternative embodiment shown on FIG. 5a, the relative layout of the two matrices of studs 80a, 80b is different from that shown on FIG. 5. Although there is still a half pitch shift between the two matrices along the transverse direction 60, there is no longer any shift along the direction of circulation of the flow 52a. Consequently, the studs 80a, 80b of the first and second series of studs are arranged so as to define an alternation between the first columns CP1 each made exclusively with the studs 80a of the first series, and second columns CP2 each made exclusively with the studs 80b of the second series. On the other hand, the first and second rows LP1, LP2 are grouped in pairs such that within a single row LP of this set of studs 80a, 80b also in the form of a matrix, the studs 80a of the first series are arranged in alternation with the studs 80b of the second series.

Figure 6:
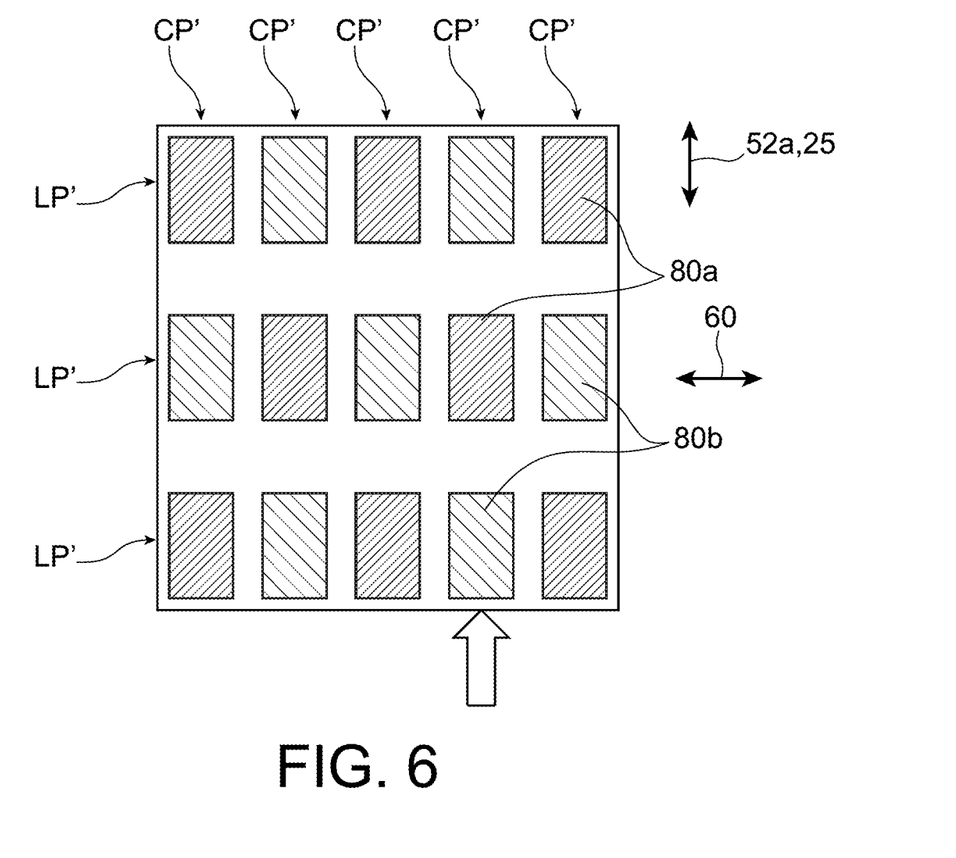
FIG. 6 is a view similar to the view in FIG. 5, with the studs arranged according to a second preferred embodiment of the invention.

Finally, according to a second embodiment shown on FIG. 6, the studs 80a of the first series are staggered, and the studs 80b of the second series are also staggered. Once the intrados body has been assembled on the extrados body, the set of studs 80a, 80b forms a matrix with the columns of studs CP', and the rows of studs LP'. Each row LP' is formed by an alternation between the studs 80a and studs 80b, and each column CP' is formed by the alternation between studs 80a and studs 80b.

With reference once again to FIG. 2, during operation of the engine, lubricant circulating through the circuit 56 is introduced into the first internal passage 50a along the first radially outwards direction 52a. The lubricant temperature at this stage is high. Heat exchange then takes place between this lubricant following the studs 80a, 80b of the first passage 50a, and the fan flow following the external surface of the intrados and extrados walls. After having been redirected by the bend 54 into the second passage 50b, the lubricant is similarly cooled in this passage, still by heat exchange with the fan air flow, while circulating along the second main flow direction 52b. The cooled lubricant is then extracted from the vane 24 and redirected through the closed circuit 56 towards elements to be lubricated and/or to a lubricant tank from which the cooled lubricant is pumped to lubricate elements.

Obviously, an expert in the subject can make various modifications to the invention as it has just been described through non-limitative examples. In particular, the technical characteristics specific to each embodiment described above can be combined together without going outside the scope of the invention. Finally, note that in the case (not shown) of inlet guide vanes to straighten the air flow upstream from the fan, these vanes are located in the entire fan air flow around a non-rotating air inlet cone, the roots of the vanes then being connected to this fixed air inlet cone.

The invention claimed is:

1. Guide vane that will be arranged in all or part of an air flow stream of a fan of a twin spool aircraft turbine engine, the guide vane comprising a root, a tip and an aerodynamic part straightening the flow stream arranged between the vane root and tip, the vane comprising an extrados body defining at least part of an extrados surface of the aerodynamic part, and an intrados body defining at least part of an intrados surface of the aerodynamic part, this comprising at least one internal lubricant cooling passage equipped with flow disturbing studs and delimited at least partly by the intrados and extrados body fixed to each other, wherein a first series of studs is made in a single piece with the extrados body, the studs of the first series defining a first inter-stud space between them, in that a second series of studs is made in a single piece with the intrados body, the studs of the second series defining a second inter-stud space between them through which studs of the first series pass while the studs of the second series pass through the first inter-stud space, and in that the end of the studs of the first series is located at a distance from the intrados body, and the end of the studs of the second series is located at a distance from the extrados body.

2. Vane according to claim 1, wherein each of the first and second series of studs is in the form of a matrix defining rows and columns of the studs.

3. Vane according to claim 2, wherein the studs of the first and second series of studs are staggered.

4. Vane according to claim 2, wherein the studs of the first and second series of studs are arranged so as to define an alternation of columns exclusively with studs of the first series, and columns made exclusively with studs of the second series.

5. Vane according to claim 1, wherein the studs in each of the first and second series of studs are staggered.

6. Vane according to claim 5, wherein the studs of the first and second series of studs are arranged so as to jointly define a matrix forming rows and columns of studs, each of the rows and columns in the matrix then being made by the alternation of studs in the first series and studs in the second series.

7. Vane according to claim 1, wherein each stud has a generally circular, oblong, square or rectangular cross-section.

8. Vane according to claim 1, wherein each stud has an oblong general shape, with the long axis arranged to be parallel to a principal flow direction of lubricant in the cooling passage.

9. Turbomachine for an aircraft, comprising a plurality of guide vanes according to claim 1, located downstream or upstream from a fan of the turbomachine.

10. Method of fabricating a guide vane according to claim 1, wherein it comprises a step in which studs are made by machining the extrados and intrados bodies.

\* \* \* \* \*